(12) United States Patent
Holly

(10) Patent No.: US 11,840,955 B2
(45) Date of Patent: Dec. 12, 2023

(54) INTERNAL COMBUSTION ENGINE FOR A MOTOR VEHICLE, IN PARTICULAR FOR A CAR

(71) Applicant: Mercedes-Benz Group AG, Stuttgart (DE)

(72) Inventor: Werner Holly, Merklingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/796,067

(22) PCT Filed: Dec. 9, 2020

(86) PCT No.: PCT/EP2020/085248
§ 371 (c)(1),
(2) Date: Jul. 28, 2022

(87) PCT Pub. No.: WO2021/151567
PCT Pub. Date: Aug. 5, 2021

(65) Prior Publication Data
US 2023/0067522 A1 Mar. 2, 2023

(30) Foreign Application Priority Data
Jan. 29, 2020 (DE) ...................... 10 2020 000 534.9

(51) Int. Cl.
*F02B 19/08* (2006.01)
*F02B 19/18* (2006.01)
*F02B 23/10* (2006.01)

(52) U.S. Cl.
CPC ............. *F02B 19/18* (2013.01); *F02B 23/10* (2013.01); *F02B 2023/106* (2013.01); *F02B 2023/107* (2013.01)

(58) Field of Classification Search
CPC .... F02B 19/08; F02B 19/18; F02B 2023/106; F02B 2023/107
(Continued)

(56) References Cited

U.S. PATENT DOCUMENTS

| 4,071,001 A * | 1/1978 | Goto | ................... | F02B 19/1066 |
| | | | | 123/430 |
| 4,072,134 A * | 2/1978 | Noguchi | ............. | F02B 19/1066 |
| | | | | 123/274 |

(Continued)

FOREIGN PATENT DOCUMENTS

| AT | 13 172 U1 | 7/2013 |
| CN | 108425741 A | 8/2018 |

(Continued)

OTHER PUBLICATIONS

PCT/EP2020/085248, International Search Report dated Jan. 28, 2021 (Two (2) pages).

(Continued)

*Primary Examiner* — Erick R Solis
(74) *Attorney, Agent, or Firm* — Crowell & Moring LLP

(57) ABSTRACT

An internal combustion engine for a motor vehicle includes a combustion chamber in which a first tumble-shaped current of a fuel-air mixture is settable. A pre-chamber spark plug is allocated to the combustion chamber which has a pre-chamber which is fluidically connected to the combustion chamber via a plurality of openings where via the plurality of openings a part of the fuel-air mixture flows out of the combustion chamber and into the pre-chamber. The plurality of openings are formed such that the part of the fuel-air mixture that flows into the pre-chamber via the plurality of openings has a second tumble-shaped current where the second tumble-shaped current is opposite to the first tumble-shaped current.

2 Claims, 1 Drawing Sheet

(58) Field of Classification Search
USPC .................... 123/262, 266, 268, 286, 290
See application file for complete search history.

(56) References Cited

U.S. PATENT DOCUMENTS

| | | | |
|---|---|---|---|
| 11,002,178 B1* | 5/2021 | Zhang | ............... F02B 19/18 |
| 2014/0251259 A1 | 9/2014 | Dumser et al. | |
| 2018/0230895 A1 | 8/2018 | Mori | |
| 2021/0246822 A1* | 8/2021 | Ono | ............ F02B 19/1061 |
| 2022/0077662 A1* | 3/2022 | Shimamoto | ........... H01T 13/32 |

FOREIGN PATENT DOCUMENTS

| | | |
|---|---|---|
| CN | 113840982 A | 12/2021 |
| DE | 2 232 898 A1 | 1/1974 |
| DE | 10 2017 009 228 A1 | 4/2019 |
| DE | 10 2017 009 235 A1 | 4/2019 |
| EP | 2 247 837 B1 | 11/2010 |
| JP | 49-61504 A | 6/1974 |
| JP | 8-284665 A | 10/1996 |
| JP | 2009-270540 A | 11/2009 |
| JP | 2020-191160 A | 11/2020 |
| WO | WO 2020/235332 A1 | 11/2020 |

OTHER PUBLICATIONS

German-language German Office Action issued in German application No. 10 2020 000 534.9 dated Sep. 17, 2020 (Six (6) pages).
Japanese Office Action issued in Japanese application No. 2022-543591 dated Aug. 1, 2023, with English translation (Seven (7) pages).
Chinese Office Action issued in Chinese Application No. 202080094448.8 dated Aug. 9, 2023, with partial English translation (11 pages).

\* cited by examiner

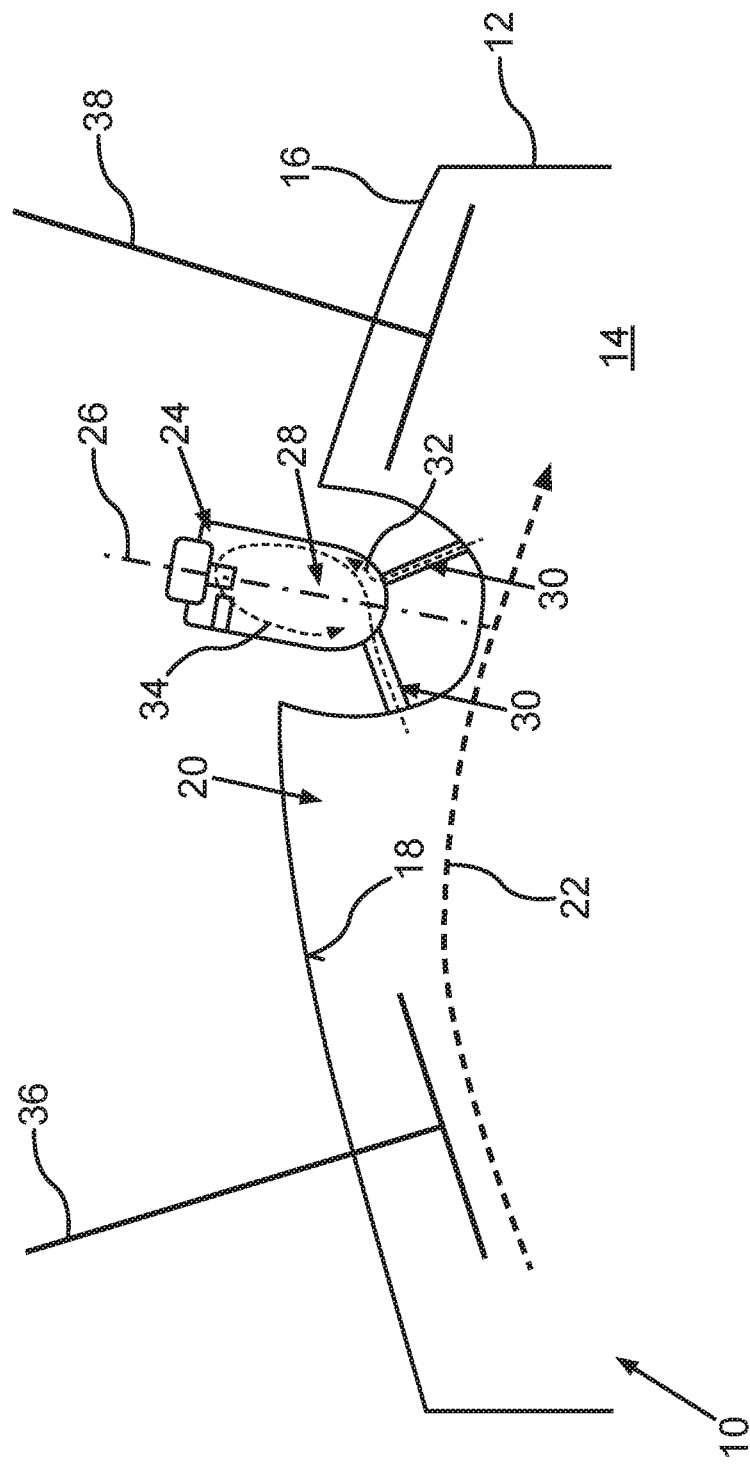

INTERNAL COMBUSTION ENGINE FOR A MOTOR VEHICLE, IN PARTICULAR FOR A CAR

BACKGROUND AND SUMMARY OF THE INVENTION

The invention relates to an internal combustion engine for a motor vehicle, in particular for a car.

Such an internal combustion engine for a motor vehicle, in particular for a car, is already known from DE 10 2017 009 228 A1 and DE 10 2017 009 235 A1. The internal combustion engine has at least one combustion chamber, in which a first tumble-shaped current of a fuel-air mixture, also simply referred to as the mixture, is adjusted at least during a fueled operation of the internal combustion engine. The first tumble-shaped current of the fuel-air mixture is also referred to as the charging movement or tumble-shaped charging movement, since, for example, the fuel-air mixture is also referred to as charge. The internal combustion engine moreover has a pre-chamber spark plug allocated to the combustion chamber, the pre-chamber spark plug having a pre-chamber. The pre-chamber is fluidically connected to the combustion chamber via several openings. At least one part of the fuel-air mixture from the combustion chamber can be introduced into the pre-chamber via the openings. Furthermore, US 2014/0251259 A1 discloses a pre-chamber system for an internal combustion engine.

Furthermore, US 2018/0230895 A1 discloses an internal combustion engine, having a main combustion chamber, which is arranged between a cylinder head and a piston facing towards the cylinder head. A pre-chamber system for an internal combustion engine is known from AT 13 172 U1. Moreover, an internal combustion engine having a pre-chamber spark plug is known from JP 2009-270540 A.

The object of the present invention is to further develop an internal combustion engine of the kind specified at the start in such a way that a particularly advantageous operation can be achieved.

In order to further develop an internal combustion engine, preferably formed as a reciprocating piston engine, in such a way that a particularly advantageous operation can be achieved, it is provided according to the invention that the openings are formed to induce a second tumble-shaped current, in opposition to the first tumble-shaped current set in the combustion chamber, of the part of the fuel-air mixture flowing into the pre-chamber via the openings in the pre-chamber. In other words, the internal combustion engine is formed to form the tumble-shaped currents in opposition or incongruously. Expressed differently again, the openings formed as bores, for example, via which the pre-chamber is fluidically connected to the combustion chamber, are aligned or arranged and/or formed in such a way that the openings induce the second tumble-shaped current of the fuel part of the fuel-air mixture flowing into the pre-chamber via the openings, wherein the first tumble-shaped current takes place around a first axis of rotation in a first direction of rotation and the second tumble-shaped current around a second axis of rotation in a second direction of rotation, wherein the second direction of rotation is opposite to or the reverse of the first direction of rotation. Here, the axes of rotation, for example, run in parallel to each other, or the axes of rotation have an angular deviation, the mathematical amount is at most 30 degrees. In other words, the angular deviation between the axes of rotation is at most +/−30 degrees. Here the following knowledge underpins the invention: combustion methods for internal combustion engines formed, for example, as petrol engines with pre-chamber spark plugs or pre-chambers tend to have reduced combustion stability or increased chances of misfiring with low loads, which can lead to a poor smooth running when idling, for example. These problems can now be avoided due to the invention. In particular, the invention makes it possible to achieve the following advantages:

particularly advantageous cleaning of the pre-chamber with the second tumble-shaped current;

thus reduced remaining gas content in the pre-chamber; and thus an extended operating range towards low loads.

The internal combustion engine is preferably formed as a petrol engine and/or as a four-valve engine and/or as a four-cylinder engine. Thus, at least or exactly four gas exchange valves are allocated to the combustion chamber, for example, of which at least or exactly two first gas exchange valves are formed as inlet valves and at least or exactly two second gas exchange valves are formed as outlet valves. Furthermore, it has been shown to be advantageous when the first tumble-shaped current runs in a clockwise direction and the second tumble-shaped current in the anti-clockwise direction based on such a viewing direction running in the axial direction of an output shaft of the internal combustion engine formed as a crankshaft, in which viewing direction the inlet valves are arranged on the left and the outlet valves on the right. Here, it is conceivable that the respective axis of rotation, also referred to as a tumble axis, runs in parallel to the axial direction or to the longitudinal axis of the output shaft formed, for example, as a crankshaft.

Further advantages, features and details of the invention emerge from the description below of a preferred exemplary embodiment and by means of the drawing. The features and feature combinations mentioned above in the description and the features and feature combinations mentioned below in the description of the FIGURE and/or shown only in the single FIGURE can be used not only in the respectively specified combination, but also in other combinations or on their own without leaving the scope of the invention.

BRIEF DESCRIPTION OF THE DRAWING

The drawings show in the single FIGURE a schematic sectional view of an internal combustion engine according to the invention for a motor vehicle.

DETAILED DESCRIPTION OF THE DRAWING

The single FIGURE shows an internal combustion engine 10, preferably formed as a reciprocal piston engine and also referred to as a motor or combustion motor, for a motor vehicle, in particular for a car, in a schematic sectional side view. This means that the motor vehicle in its completely produced state has the internal combustion engine 10 and can be driven by means of the internal combustion engine 10. The internal combustion engine 10 has, for example, a first housing element 12, which is formed, for example, as a crank housing or as a cylinder crank housing. The housing element 12 forms or delimits at least one cylinder 14 of the internal combustion engine 10.

The internal combustion engine 10 moreover has a second housing element 16, which is formed separately from the housing element 12 and is connected to the housing element 12. The housing element 16 is, for example, a cylinder head, which forms at least one combustion chamber roof 18. A piston, which cannot be seen in the FIGURE, of the internal combustion engine 10, for example, is received in a translationally moveable manner in the cylinder 14. The internal combustion engine 10 moreover has an output shaft that cannot be seen in the FIGURE and is presently formed as a crankshaft, which is mounted on the housing element 12 rotatably around an axis of rotation in relation to the housing element 12. Here, the piston is flexibly connected to the crankshaft via a conrod, whereby the translational movements of the piston in the cylinder 14 can be converted or are converted into a rotational movement of the crankshaft around the axis of rotation in relation to the housing element 12. The cylinder 14, the combustion chamber roof 18 and the piston each partially delimit a combustion chamber 20 of the internal combustion engine 10, in the combustion chamber 20 of which combustion processes take place during a fueled operation of the internal combustion engine 10.

During the fueled operation, at least air and fuel, in particular liquid fuel, are introduced into the combustion chamber 20 within a respective work cycle of the internal combustion engine 10, whereby a fuel-air mixture also simply referred to as a mixture or load is formed in the combustion chamber 20. Here, the internal combustion chamber 10 is formed to induce a first tumble-shaped current of the fuel-air mixture in the combustion chamber 20. In other words, a first tumble-shaped current of the fuel-air mixture in the combustion chamber 20 is set during the fueled operation of the internal combustion engine 10 within the respective work cycle, wherein this first tumble-shaped current of the fuel-air mixture in the combustion chamber 20, i.e., the tumble-shaped load movement, is illustrated in the FIGURE by an arrow 22.

Furthermore, a pre-chamber spark plug 24 is allocated to the combustion chamber 20. The pre-chamber spark plug 24, whose longitudinal axis formed, for example, as the central longitudinal axis is labelled with 26 in the FIGURE, has a pre-chamber 28, which is fluidically connected to the combustion chamber 20 via openings 30 formed, for example, as bores, and is otherwise preferably separated from the combustion chamber 20. At least one part of the fuel-air mixture illustrated by arrows 32 in the FIGURE can be introduced or is introduced via the openings 30 from the combustion chamber 20 into the pre-chamber 28 during the fueled operation and within the respective work cycle.

In order to now be able to implement a particularly advantageous operation of the internal combustion engine 10, in particular an advantageous smooth running even with low rotational speeds of the internal combustion engine 10, the openings 30 are formed to induce a second tumble-shaped current of the part flowing in or flowed in to the pre-chamber 28 via the openings 30 (arrows 32 and 34) of the fuel-air mixture opposite the first tumble-shaped current (arrow 22) and illustrated in the FIGURE by an arrow 34. It can be seen by means of arrows 22 and 34 that the tumble-shaped currents run around respective axes of rotation, also referred to as tumble axes, and here have a respective direction of rotation around the respective axis of rotation. Here, the directions of rotation of the tumble-shaped currents are in opposition to each other.

Exactly two gas exchange valves formed as inlet valves, for example, are allocated to the combustion chamber 20, wherein, of the inlet valves, one of the inlet valves can be seen in the FIGURE and is labelled there with 36. Moreover, exactly two gas exchange valves formed as outlet valves are allocated to the combustion chamber 20, wherein, of the outlet valves, one of the outlet valves can be seen in the FIGURE and is labelled with 38. FIG. 1 shows the internal combustion engine 10 and, in particular, the combustion chamber 20 with a viewing direction in the axial direction of the crankshaft in such a way that the inlet valves 36 are arranged on the left or on the left-hand side and the outlet valves 38 on the right or on the right-hand side. In relation to this viewing direction the first tumble-shaped current runs anti-clockwise and, in relation to the viewing direction, the second tumble-shaped current runs in the anti-clockwise direction. Thus, a particularly advantageous operation can be achieved.

LIST OF REFERENCE CHARACTERS

10 Internal combustion engine
12 Housing element
14 Cylinder
16 Housing element
18 Combustion chamber roof
20 Combustion chamber
22 Arrow
24 Pre-chamber spark plug
26 Longitudinal axis
28 Pre-chamber
30 Opening
32 Arrow
34 Arrow
36 Inlet valve
38 Outlet valve

The invention claimed is:

1. An internal combustion engine for a motor vehicle, comprising:
   a combustion chamber in which a first tumble-shaped current of a fuel-air mixture is settable; and
   a pre-chamber spark plug allocated to the combustion chamber which has a pre-chamber which is fluidically connected to the combustion chamber via a plurality of openings, wherein via the plurality of openings a part of the fuel-air mixture flows out of the combustion chamber and into the pre-chamber;
   wherein the plurality of openings are formed such that the part of the fuel-air mixture that flows into the pre-chamber via the plurality of openings has a second tumble-shaped current and wherein the second tumble-shaped current is opposite to the first tumble-shaped current;
   wherein the first tumble-shaped current rotates around a first axis of rotation and the second tumble-shaped current rotates around a second axis of rotation;
   wherein the first and second axes of rotation have an angular deviation that is at most 30 degrees.

2. The internal combustion engine according to claim 1, wherein, in relation to a viewing direction running in an axial direction of an output shaft of the internal combustion engine in which an inlet valve allocated to the combustion chamber is disposed on a left side and an outlet valve allocated to the combustion chamber is disposed on a right side, the first tumble-shaped current runs in a clockwise direction and the second tumble-shaped current runs in a counter-clockwise direction.

* * * * *